United States Patent
Blakely et al.

(10) Patent No.: US 11,612,194 B2
(45) Date of Patent: *Mar. 28, 2023

(54) APPAREL WITH BODY MAPPED WATERPROOF-BREATHABLE PORTIONS

(71) Applicant: Under Armour, Inc., Baltimore, MD (US)

(72) Inventors: Kyle Blakely, Baltimore, MD (US); Katarzyna Schoewe, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 301 days.

This patent is subject to a terminal disclaimer.

(21) Appl. No.: 16/826,572

(22) Filed: Mar. 23, 2020

(65) Prior Publication Data
US 2020/0214368 A1    Jul. 9, 2020

Related U.S. Application Data

(63) Continuation of application No. 15/455,394, filed on Mar. 10, 2017, now Pat. No. 10,595,570.

(60) Provisional application No. 62/306,464, filed on Mar. 10, 2016.

(51) Int. Cl.
| | | |
|---|---|---|
| *A41D 3/00* | (2006.01) |
| *A41D 31/02* | (2019.01) |
| *B32B 37/00* | (2006.01) |
| *B32B 37/12* | (2006.01) |
| *B32B 37/18* | (2006.01) |
| *A41D 31/102* | (2019.01) |

(52) U.S. Cl.
CPC ............... *A41D 3/00* (2013.01); *A41D 31/02* (2013.01); *B32B 37/0084* (2013.01); *B32B 37/1292* (2013.01); *B32B 37/182* (2013.01); *A41D 31/102* (2019.02); *A41D 2200/20* (2013.01)

(58) Field of Classification Search
CPC ........ A41D 3/00; A41D 31/02; A41D 31/102; A41D 2200/20; B23B 37/0084; B23B 37/1292; B23B 37/182
USPC .............................................................. 2/84
See application file for complete search history.

(56) References Cited

U.S. PATENT DOCUMENTS

| | | |
|---|---|---|
| 4,194,041 A | 3/1980 | Gore et al. |
| 4,443,511 A | 4/1984 | Worden et al. |
| 5,529,830 A | 6/1996 | Dutta et al. |

(Continued)

FOREIGN PATENT DOCUMENTS

GB    2350073 A    11/2000

*Primary Examiner* — Gloria M Hale
(74) *Attorney, Agent, or Firm* — Edell, Shapiro & Finnan, LLC

(57) ABSTRACT

A garment includes a first material layer including a first surface, a second material layer laminated to the first material layer, where the second material layer includes a second surface, and a laminate material disposed in a non-continuous manner between the first and second surfaces of the first and second material layers. An amount of laminate material disposed between the first and second material layers varies at different zones defined along the first surface of the first material layer. The laminate material can be applied via a dot lamination process so as to form an array of laminate dots that varies by one or more of spacing between laminate dots, dimensions of laminate dots and shapes of laminate dots at the different zones.

16 Claims, 7 Drawing Sheets

(56) References Cited

U.S. PATENT DOCUMENTS

| | | | |
|---|---|---|---|
| 5,916,829 A | 6/1999 | Girard et al. | |
| 6,855,171 B2 | 2/2005 | Morlacchi | |
| 10,595,570 B1* | 3/2020 | Blakely | A41D 31/02 |
| 2002/0082542 A1 | 6/2002 | Hall | |
| 2005/0075028 A1 | 4/2005 | Rock et al. | |
| 2009/0089911 A1 | 4/2009 | Smith | |
| 2009/0260126 A1 | 10/2009 | Rock et al. | |
| 2011/0271416 A1 | 11/2011 | Sturgill et al. | |
| 2014/0322497 A1* | 10/2014 | Kelsey | B32B 5/04 |
| | | | 156/85 |
| 2016/0044980 A1 | 2/2016 | Greenacre | |
| 2018/0084845 A1 | 3/2018 | Cumiskey | |
| 2018/0352883 A1 | 12/2018 | Schlee et al. | |

\* cited by examiner

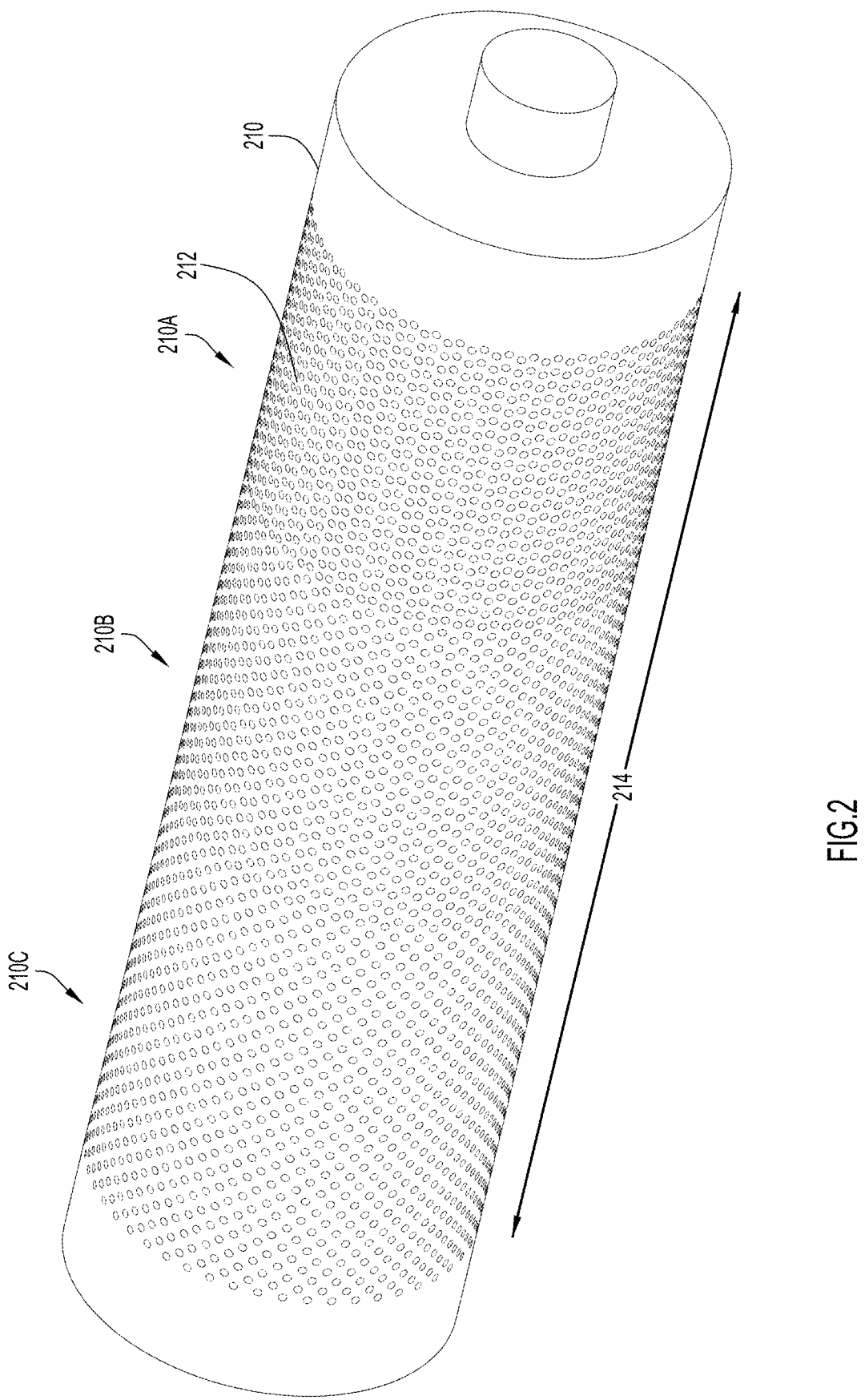

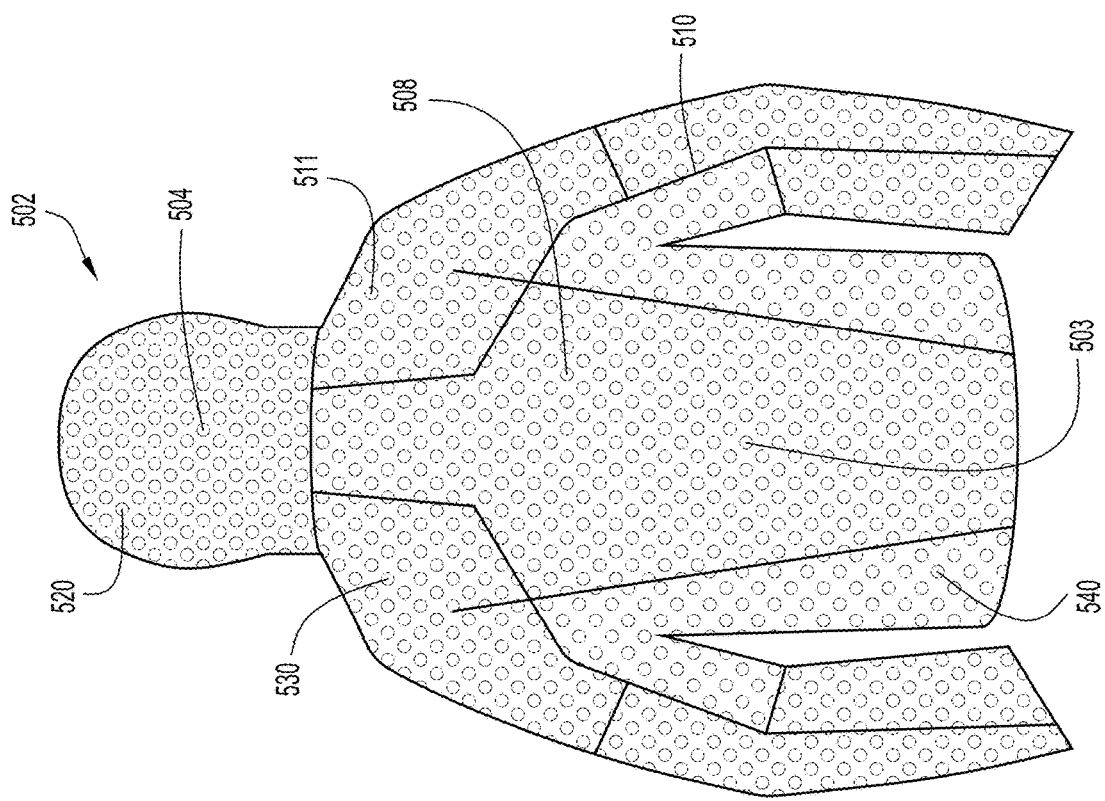
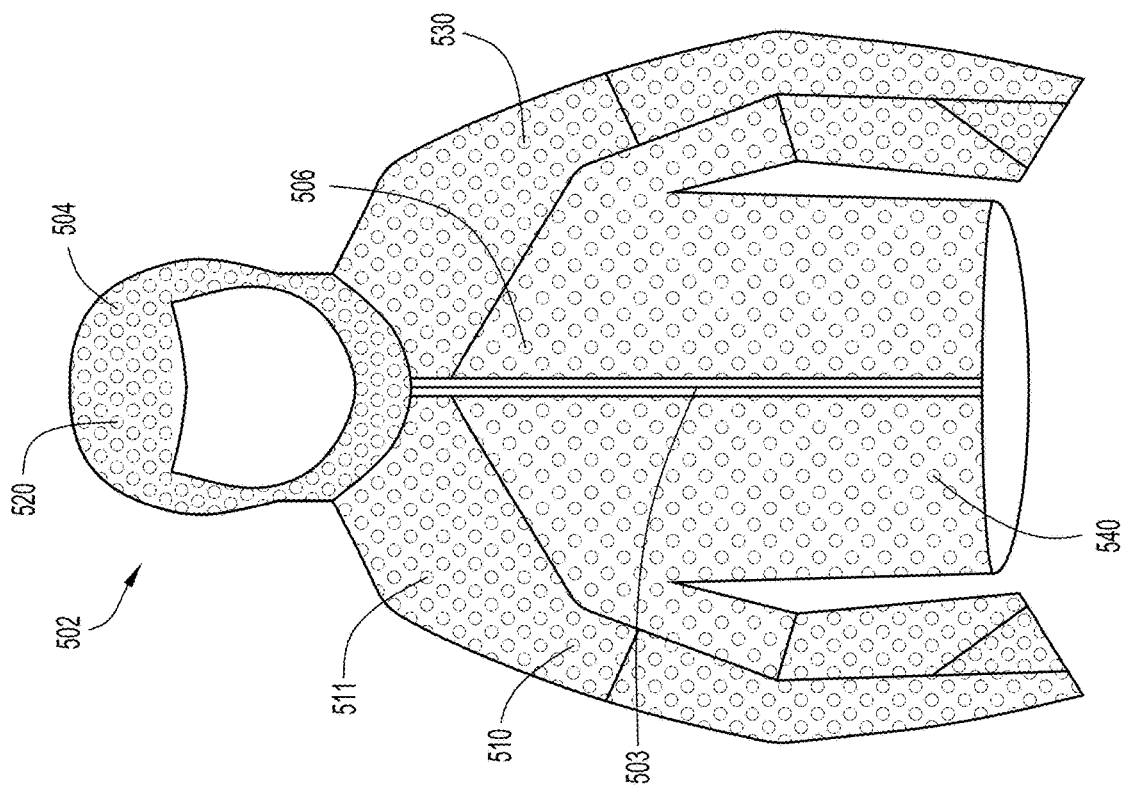

APPAREL WITH BODY MAPPED WATERPROOF-BREATHABLE PORTIONS

CROSS-REFERENCE TO RELATED APPLICATION

This application is a divisional of U.S. patent application Ser. No. 15/455,394, entitled "Apparel with Body Mapped Waterproof-Breathable Portions", filed Mar. 10, 2017 (issued on Mar. 24, 2020 as U.S. Pat. No. 10,595,570), which claims priority under 35 U.S.C. 119(e) to U.S. Provisional Patent Application Ser. No. 62/306,464, entitled "Apparel With Body Mapped Waterproof-Breathable Portions", filed Mar. 10, 2016, the disclosures of which are incorporated herein by reference in their entireties.

FIELD

The present invention relates to waterproof breathable garments or articles of apparel.

BACKGROUND

Garments that are both waterproof and breathable are desirable for a variety of outdoor activities in which rainwear may be desirable (e.g., hiking, camping, running and all other sorts of outdoor activities in which a user is subjected to potentially wet environments). Waterproof breathable garments can have a number of different types of construction with different layers forming the garment. Conventional types of waterproof-breathable garments are designed with a 2, 2.5 or 3 layer construction. In each type of construction, at least one layer is provided with waterproof-breathable characteristics designed to keep the user dry while providing some level of breathability through the garment to prevent a certain level of body perspiration or water vapor permeability so as to reduce the potential of the user overheating when wearing the garment.

The challenge in providing a desirable waterproof-breathable garment is ensuring sufficient waterproof and breathable characteristics while minimizing the bulkiness, stiffness, weight and feel when worn by the user.

SUMMARY

In example embodiments, an article of apparel or garment includes a first material layer including a first surface, a second material layer laminated to the first material layer, where the second material layer includes a second surface, and a laminate material disposed in a non-continuous manner between the first and second surfaces of the first and second material layers. An amount of laminate material disposed between the first and second material layers varies at different zones defined along the first surface of the first material layer.

In other example embodiments, the laminate material can be applied via a dot lamination process so as to form an array of laminate dots that varies by one or more of spacing between laminate dots, dimensions of laminate dots and shapes of laminate dots at the different zones.

The above and still further features and advantages of the present invention will become apparent upon consideration of the following detailed description that includes non-limiting example embodiments thereof.

BRIEF DESCRIPTION OF THE DRAWINGS

FIG. 2 depicts a laminate roller for use in the system of FIG. 1 that incorporates variable coverage of laminate dots applied on a surface of a material layer in accordance with the disclosure herein.

FIGS. 5A and 5B depict an example embodiment of a garment formed in accordance with the disclosure herein that includes different zones of laminate coverage and correspondingly different levels of waterproof-breathability characteristics mapped to different body portions of the garment.

Figure 1:
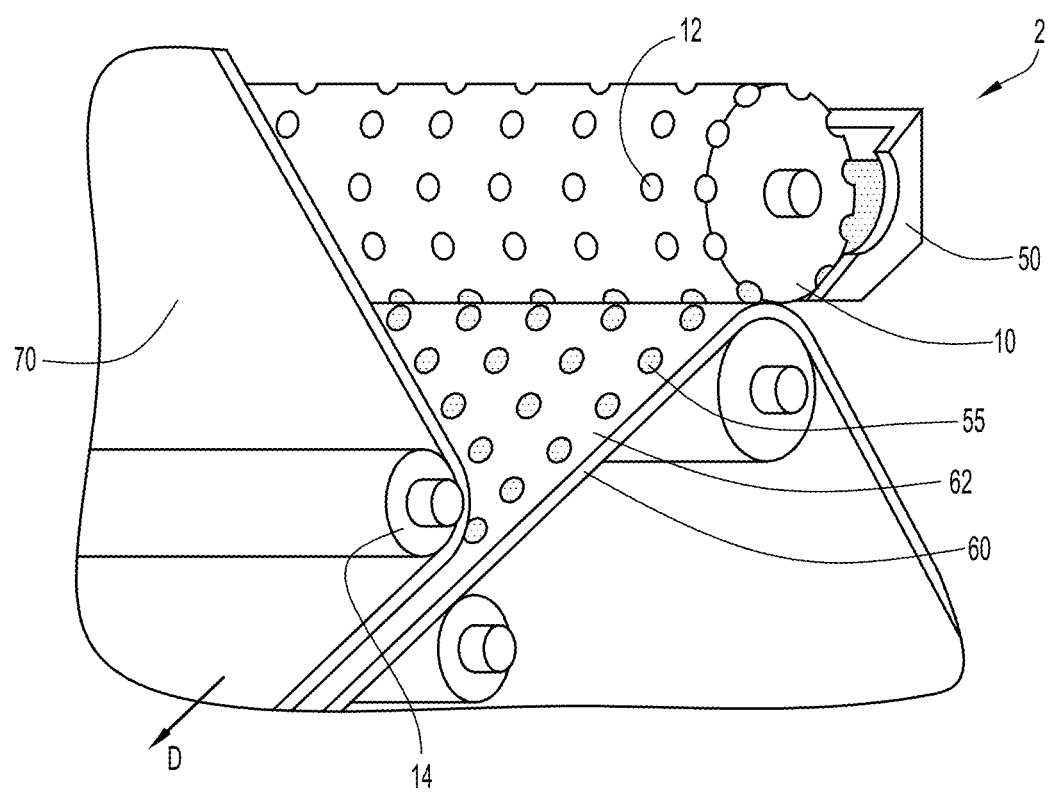
FIG. 1 depicts a dot lamination system form lamination of two material sheets or layers together.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

DETAILED DESCRIPTION

Aspects of the disclosure are disclosed herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Further, the terms "comprising," "including," "having," and the like, as used with respect to embodiments of the present disclosure, are synonymous.

As described herein, a garment or article of apparel that has waterproof-breathable (WP/BR) characteristics includes a plurality of material layers comprising an outer fabric layer and a film layer or membrane layer laminated to a surface (e.g., inner surface or surface facing the body of the wearer)

of the outer fabric layer, where the membrane layer contributes substantially to the WP/BR characteristics for the garment.

During manufacture of the WP/BR garment, the WP/BR membrane layer can be applied to the outer fabric layer via a hot melt gravure lamination process (also referred to herein as a dot lamination process). The dot lamination process applies a plurality of individual and separately spaced hot melt laminate members or dots to a surface of one of the two material layers, followed by pressing the other layer onto the laminate dot coated layer to join or laminate the two layers together.

As further described herein, a garment having enhanced breathable/air permeability characteristics can also be formed using a dot lamination process as described herein and implemented for forming the WP/BR garment.

The dot lamination process described herein enhances WP/BR (and air permeable) features within the garment. The dot lamination process can vary the spacing, dimensions, shapes, etc. of the laminate dots applied to the surface of one of the material layers at different regions or zones along the material layer surface to achieve a variation in amount of laminate material disposed on the material layer surface. The amount of laminate material applied to a particular region or zone of a material layer surface can be defined, e.g., by areal number density (defined as number of laminate dots per unit area at a particular zone of the material layer surface), areal coverage (defined as percentage of surface area covered by laminate material at a particular zone of the material layer surface) and/or areal density (defined as amount of laminate material on material layer surface at a particular zone as measured in units such as $g/m^2$ or gsm). The variation in amount of the laminate dots applied at different regions or zones of the material layer provides a resultant effect in that WP/BR features are also varied at the corresponding regions or zones of the garment (i.e., the portions of the garment that include the regions or zones of the material layer).

The WP/BR characteristics of a garment can be determined based upon any conventional and/or other suitable methods in the garment or other industries. For example, garments can be tested for a waterproof (WP) rating based upon how much water pressure must be applied to a surface of the garment to result in the onset of water leaking through the garment. A conventional industry test applied to WP/BR garments provides a waterproof (WP) rating in millimeters (mm) based upon a static-column test, which defines the height that is required for a column of water within a 1 inch by 1 inch (inner dimension) square tube or a 1 inch inner diameter round tube placed over a portion of the WP/BR garment material to cause the water to start passing or leaking through the garment over a selected period of time (e.g., 24 hours or less). An example waterproof rating for apparel and other fabric materials for outdoor or other uses is as follows:

TABLE 1

General Waterproof Ratings for Apparel in Outdoor Gear Industry

| Waterproof Rating (mm) | Water Resistance | What garment can withstand |
|---|---|---|
| 0-5,000 | No resistance to some resistance to moisture | Light rain, dry snow, no pressure |
| 6,000-10,000 | Rainproof and waterproof under light pressure | Light rain, average snow, light pressure |
| 11,000-15,000 | Rainproof and waterproof except under high pressure | Moderate rain, average snow, light pressure |
| 16,000-20,000 | Rainproof and waterproof under high pressure | Heavy rain, wet snow, some pressure |
| 20,000+ | Rainproof and waterproof under very high pressure | Heavy rain, wet snow, high pressure |

A breathability (BR) rating for a WP/BR garment can be defined in relation to how much water vapor can pass through the garment from the inside to the outside (e.g., to remove perspiration or water vapor within the inside layer to the outside layer) over a given period of time. A conventional, industry standard definition to quantify breathability of a WP/BR garment is a moisture vapor transmission rate (MVTR), which has units of grams of water moisture per square meter of garment material per day ($g/m^2$/day). The larger the MVTR value indicates a greater breathability (BR) for a WP/BR garment. For example, an MVTR value for a garment of at least about 5,000 $g/m^2$/day might be desirable for basic activities (light hiking), while for more rigorous activities where the user has a greater amount of perspiration/body heat generated during the activities a suitable MVTR value for a garment might be in the range of 10,000-15,000 $g/m^2$/day or even greater (e.g., 20,000 $g/m^2$/day or greater).

Water proof breathable (WP/BR) garments typically include a plurality of material layers, where at least one layer of the garment comprises an outer fabric layer (e.g., the outermost layer of the garment) and at least one layer of the garment comprises a membrane that at least partially provides or imparts WP/BR characteristics for the garment.

As used herein, the term fabric (e.g., standing along or as a fabric layer) refers to a textile material that can be formed by any one or more suitable types of fibers, filaments and/or yarns combined in any suitable manner. In particular, a fabric layer can be formed by any suitable process including, without limitation, weaving, knitting, forming a nonwoven web, etc. The fibers, filaments and/or yarns used to form the fabric layer can comprise any conventional and/or other types of natural materials (e.g., cotton, silk, etc.) and/or synthetic polymer materials (e.g., polyolefins such as polyethylene, polypropylene, polybutylene, etc., polyesters such as polyethylene terephthalate, polyacrylamides, polyurethanes, polylactic acids, polyamides such as nylon, polyvinyl alcohol, and any variety of copolymers or combinations thereof), where any of the fibers, filaments and/or yarns can have any one or more suitable cross-sectional shapes and/or combinations of polymer components (e.g., homopolymer components or multi-polymer components). The fabric layer can further be formed of any one or more combinations of fibers, filaments and/or yarns having the same or varying degrees of elasticity. For example, the fabric layer can be formed having 2-way or 4-way stretch characteristics. Some non-limiting examples of elastic or stretchable fabric materials suitable for forming the outer fabric layer are fabrics comprising one or more combinations of polyester-polyurethane copolymers referred to generally as elastane (e.g., Spandex materials or materials commercially available under the trademark LYCRA).

The outer fabric layer of the garment is a fabric layer that can be formed of a durable material that is capable of withstanding exposure to outdoor elements (e.g., sunlight, moisture, etc.) with minimal degradation to the outer fabric layer. Non-limiting examples of materials used to form the outer fabric layer include nylon, polyester, spandex or any of the other types of materials previously described for the garment fabric layers.

The WP/BR membrane layer is constructed of a suitable material that provides adequate water repelling/hydrophobicity characteristics while also having a suitable porosity or porous characteristics to allow for air and/or moisture vapor to penetrate or permeate through the membrane layer. An example of a suitable material for forming the WP/BR membrane layer is a polytetrafluoroethylene (PTFE) or teflon material designed with suitable hydrophobicity and porosity characteristics, such as a stretched PTFE material commercially available under the trademark GORE-TEX. Another example of a suitable material for forming the WP/BR membrane layer is a polyurethane (PU) material designed with suitable hydrophobicity and porosity characteristics. A further example of a suitable material for forming the WP/BR membrane layer is a polypropylene (PP) material designed with suitable hydrophobicity and porosity characteristics. Further, while a single membrane layer is described herein in relation to the WP/BR garment, it is noted that the membrane can comprise two or more layers of the same or different types of membrane materials.

Some non-limiting examples of WP/BR garments having a membrane layer (e.g., a PTFE and/or PU material layer) laminated to an inner or user body facing surface of an outer fabric layer include 2 layer, 2.5 layer and 3 layer designs. A 2 layer WP/BR garment is basically defined by a 2 layer structure in which the outer fabric layer and WP/BR membrane layer are laminated together. An inner fabric layer or inner mesh liner or scrim can be provided on the inside of the garment (i.e., side of garment that faces the body of the user/wearer), where the inner liner hangs loosely in relation to (i.e., not laminated with) the combined membrane layer/outer fabric layer. The inner liner of the 2 layer structure provides a suitable interface with the wearer's body while also serving to protect the membrane layer from frictional contact with the user and reducing wear and tear on the membrane layer. A 2.5 layer WP/BR garment includes the same membrane layer laminated to the outer fabric layer but, instead of including the inner liner of the 2 layer design, includes a printed or sprayed-on partial coating of any suitable polymer material (e.g., polyurethane, polyolefin, polyester, etc.) over the membrane layer that serves to protect the membrane layer and provides an interface between the membrane layer and the wearer's body. A 3 layer WP/BR garment also includes the same membrane layer laminated to the outer fabric layer but further includes an inner lightweight fabric layer or scrim (e.g., a fabric material having a basis weight that is less than the basis weight of the heavier, more durable outer fabric layer) that is laminated to the membrane layer such that the membrane layer is sandwiched between the outer and inner fabric layers.

Other WP/BR garments can also be formed including any other combination of one or more fabric layers, one or more membrane layers and/or one or more other types of material layers combined via lamination and/or any other suitable connection (e.g., adhesive bonding, stitching, etc.). The material layers for WP/BR garments can have any conventional and/or other suitable thicknesses, with any two or more layers having the same or different thicknesses. For example, the membrane layer can have a smaller thickness or, alternatively, a greater thickness than the outer fabric layer and/or any other material layer. Example thicknesses of the material layers can be on the order of micrometers or microns (e.g., about 100 microns or less), millimeters (e.g., 100 millimeters or less) or even greater thicknesses. For example, the membrane layer can be on the order of microns in thickness (e.g., about 100 microns or less, such as 10 microns or less).

One issue associated with WP/BR garments is providing a garment that is suitably WP and BR for a particular application. While garments can be made with very high WP characteristics (e.g., having a WP rating of 20,000 or greater), the trade-off can be a reduction in BR characteristics as well as making the garment heavier, bulky and less flexible on the body of the wearer of the garment. In contrast, a garment can be designed that is very breathable with a sufficiently high BR rating (e.g., having a MVTR value of 10,000 g/m$^2$/day or greater) but with a sacrifice in reducing the WP rating. Thus, the challenge is to find a suitable balance between WP and BR characteristics for a garment while also rendering the garment comfortable in terms of feel and weight when worn.

In accordance with the invention, the WP/BR characteristics of a garment can be adjusted at different regions or locations along the garment by varying the manner in which the WP/BR membrane layer is laminated to one or more other layers of the garment. In particular, the amount of laminate material (e.g., as previously described herein, measured in relation to the layer surface to which the laminate material is applied by areal number density, areal coverage and/or areal density) provided as an interface between two or more material layers (e.g., between the WP/BR membrane layer and the outer fabric layer) can be varied in different regions or zones of the garment. Such variance in the amount of laminate material at different regions or zones of the garment provides a corresponding variance in the WP and BR characteristics for the garment at such zones, where such variances can be measured or quantified by WP rating (e.g., static column water pressure in mm) and BR rating (e.g., MVTR value).

The laminate material used to laminate the WP/BR membrane layer to the outer fabric layer and/or another material layer can be any suitable polymer material with a suitable melting point and/or other suitable physical properties to facilitate securing of two or more fabric and/or other layers of the garment to each other and maintaining the securing of the material layers together when subjected to a variety of temperature, moisture and/or other environmental conditions. The laminate material may further have hydrophobic properties and/or any other suitable properties that enhance the WP/BR characteristics imparted by the membrane layer. A polyurethane (PU) laminate is an example of a suitable polymer material for securing layers of the garment together.

In an example embodiment, the lamination process comprises a hot melt lamination process in which melted or molten laminate material is applied to one surface of a first material layer and a second material layer is then pressed against the laminate material covered surface of the first material layer to laminate the two layers together (where, upon drying or curing of the laminate material, the two layers are secured together by the laminate). For example, a melted, liquid or molten PU laminate can be applied to secure the outer fabric layer to the WP/BR membrane layer. However, the PU laminate can also be used to secure any two or more other material layers together (e.g., a PU laminate to secure the WP/BR membrane layer to the inner fabric layer for a 3 layer garment configuration). The laminate material is applied to the surface of at least one of the material layers in a discontinuous or non-continuous manner such that one or more gaps or spacings exist between discrete or individually separate laminate material portions applied along the material layer surface.

In an example embodiment, the laminate material is applied in a discontinuous or non-continuous array or pattern of separate and discrete molten or liquid laminate material components, also referred to herein as laminate dots, onto the surface of a material layer using a hot melt gravure or dot lamination process. An example dot lamination process for securing two material layers together is depicted in FIG. 1. In particular, the process can be implemented using a system 2 that includes a printing cylinder 10 having indentations 12 etched (or formed in any other suitable manner) along the circumference and at least some of the length of the cylinder surface. A well or trough 50 including hot melted/molten and liquefied laminate material (e.g., molten PU) at a suitable temperature and viscosity is provided in close proximity with the cylinder 10 such that, when the cylinder 10 is rotated at a suitable rotational velocity in relation to the trough 50, the cylinder 10 picks up or entrains liquefied/molten laminate material within the indentations 12.

A continuous sheet of material 60 used to form a material layer (e.g., a membrane layer) is provided (e.g., by unwinding the continuous sheet of material from a winder roll) such that a surface 62 of the material sheet 60 is in contact with the rotating cylinder 10. The material sheet 60 is further moved or advanced at a suitable velocity in relation to the cylinder 10 (e.g., via a series of rollers 14) in a direction as shown by arrow D in FIG. 1. The melted laminate material is transferred from the indentations 12 of the rotating cylinder 10 to the sheet surface 62 in the form of dots 55 spaced apart from each other. Another continuous sheet of material 70 used to form a material layer (e.g., the outer fabric layer) is provided (e.g., by unwinding the continuous sheet of material from a winder roll) and is further moved or advanced into position proximate the surface 62 of the first material sheet 60. For example, the material sheet 70 can be advanced at about the same or similar velocity as the material sheet 60 such that both sheets move in the same direction D as they are brought together and laminated to each other. A pair of rollers 14 is provided to press the material sheet 70 against the laminate dot covered surface 62 of the material sheet 60, where the rollers 14 are configured to apply a suitable force or pressure that forces the two sheets together with the laminate dots 55 disposed between the sheets. The pressing rollers 14 can also be heated to a suitable temperature to ensure the laminate material is at a sufficient temperature and physical state during the lamination process. The pressure or force provided by the rollers 14, combined with controlling the temperature of the laminate material, results in lamination of the two sheets 60, 70 to each other. For example, upon engagement of the material sheet 70 against the surface 62 of the material sheet 60, the laminate dots 55 can still be completely melted or molten and liquefied or, alternatively, only partially molten and partially solidified. At some location downstream of the rollers 14 which press the two material sheets 60, 70 together with the laminate dots 55 located at the interface between both sheets, the laminate material solidifies and/or cures to sufficiently laminate and secure the two material sheets to each other.

The pattern of dots, dimensions of dots, shape of dots, spacing between dots, etc. applied to the material sheet surface 62 are selectively controlled based upon a number of factors including, without limitation, dimensions (e.g., diameter, length, width, depth) of indentations 12 on the roller 10, rotational speed of the roller 10, linear velocity (e.g., in direction D) of the material sheets 60, 70, temperature, viscosity, density and/or other physical characteristics of the laminate material within the trough 50, and pressure applied by the rollers 14 to the material sheets 60, 70 being pressed together. In the embodiment depicted in FIG. 1, at least some of the laminate dots 55 are generally circular and/or hemispherical in shape. However, the laminate dots can have any suitable shapes including, without limitation, polygonal (e.g., square or rectangular, triangular, etc.), rounded, elliptical, and irregular or eccentric in shape, etc. Further, the sheet surface 62 can include any suitable number (e.g., two or more) of different shaped laminate dots 55. The sheet surface 62 can further have laminate dots 55 with the same or different shapes having the same or similar dimensions or, alternatively, different dimensions.

In accordance with the present invention, the lamination process can be controlled such that the spacing, dimensions, shapes, etc. of the laminate dots forming the lamination interface between two or more material layers (e.g., the membrane layer and outer fabric layer of the garment) can be varied at different regions or zones of the material layer surface upon which the laminate dots are applied, and this in turn results in a variation in the amount of laminate material that is provided at such regions or zones. This variance in amount of laminate material applied on a material layer surface results in a modification of the WP/BR characteristics of the formed garment at the different regions or zones. As described herein, this in turn facilitates mapping of different WP/BR characteristics along the garment that correspond with different body parts of a user or wearer of the garment.

As previously noted, the amount of laminate material provided within a particular region or zone of the garment can be defined in relation to the material layer surface to which it is applied as areal coverage (percentage of material layer surface area covered by laminate material at a particular zone). The variance in areal coverage of the laminate dots in the laminate interface between two material layers can vary from 0% areal coverage to 100% areal coverage, where % areal coverage refers to: (surface area covered by laminate material/total surface area)×100 for a specified or defined surface area region or zone of the material layer to which the laminate dots are applied. To ensure sufficient lamination between two material layers, there will preferably be at least about 30% areal coverage of laminate dots on a material layer. In addition, 100% areal coverage of laminate dots over a portion of a material layer results in a continuous laminate material film over this portion (i.e., laminate dots join to each other, with little or no spacing there between, such that substantially no surface area of the material layer is exposed).

As previously noted herein, a WP/BR garment can be formed including a membrane layer and an outer fabric layer (e.g., of the 2 layer, 2.5 layer or 3 layer type), in which laminate dots can be applied between the membrane layer and outer fabric layer. Laminate dots can be applied, for example, on a surface of the membrane layer (e.g., a sheet that forms the membrane layer) with the outer fabric layer then being pressed against the membrane layer to laminate the two layers together. One or more laminate rollers of a dot lamination system (e.g., one or more rollers 10 as depicted in FIG. 1) can be provided to vary the concentration or areal coverage of laminate dots along the membrane layer surface into areas designated as high coverage, medium coverage (e.g., areal coverage of laminate dots is lower in medium coverage area in relation to high coverage area), and low coverage (e.g., areal coverage of laminate dots is lower in medium coverage area in relation to high coverage area). While only three levels of varying areal coverage have been described in this example, it is noted that garments can be formed with any selected number of levels of varying areal coverage or even a spectrum of areal coverage extending from lower areas of coverage (including areas of no laminate material coverage) to highest areas of coverage (including complete, continuous laminate material coverage). In the example embodiment, low coverage of laminate dots on the material layer surface can be in a range from about 0% to about 50% areal coverage (preferably no less than about 30% areal coverage), medium coverage of laminate dots on the material layer surface can be in the range from about 40% to about 70% areal coverage, and high coverage can be in the range from about 60% to about 100% areal coverage.

It is noted that the laminate dots formed on the material layer surface can have the same or similar shapes, dimensions and/or pattern and spacing in correspondence with the arrangement of indentations on the laminate roller that applies the laminate material to the material layer surface. However, during the lamination process in which two material layers are pressed together with the laminate material providing the interface between such layers, the laminate dots can deform or change somewhat in dimensions, shape and/or spacing along the material layer surface. For example, when applying circular/hemispherical shaped laminate dots to the material layer surface at selected spacing/distances from each other in a particular zone of the material layer, the laminate dots may be altered somewhat after pressing the two material layers together in the lamination process due to the force/pressure applied to the material layers. The force/pressure applied to the material layers may compress the laminate dots causing the thickness of certain laminate dots to decrease combined with a corresponding increase in diameter or cross-sectional dimensions of the laminate dots and a corresponding reduction in spacing between laminate dots. The desired areal coverage for laminate material at zones of the material layer can take into consideration the alteration of the laminate dots after being subjected to certain degree of compression due to the pressing of the material layers together so as to maintain a suitable areal coverage in the high, medium and low ranges in particular regions or zones of the garment. Alternatively, the degree of areal coverage for zones of the garment can also be defined, as desired, based upon the dimensions/shapes/spacing of indentations on areal sections any one or more laminate roller (since each laminate roller can include areal sections that are precisely defined or mapped to correspond with particular regions or zones of the garment).

Figures 2A, 2B, 2C:
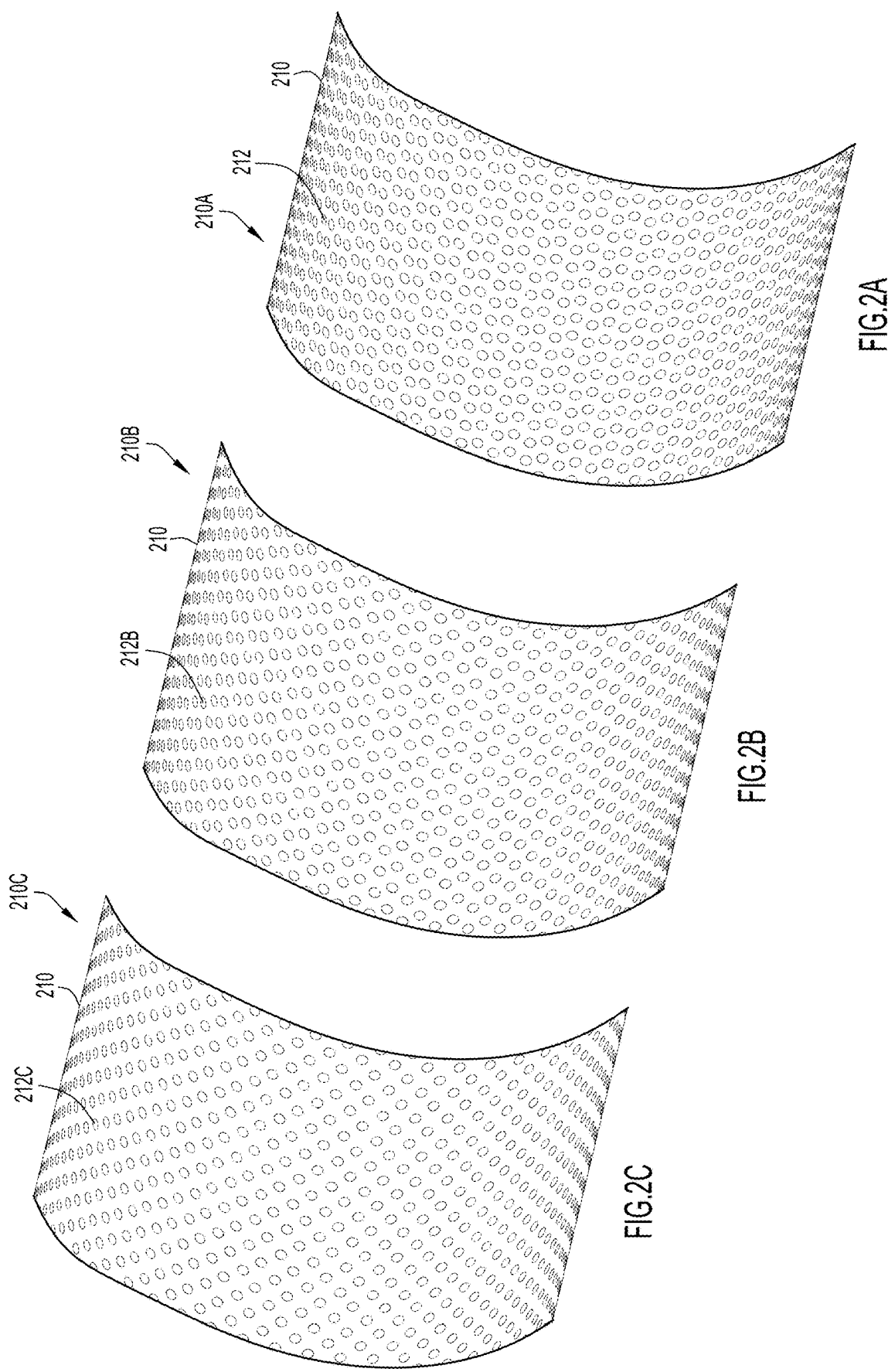
FIGS. 2A-2C depict partial cross-sectional views of different portions of the laminate roller of FIG. 2.

An example embodiment is depicted in FIG. 2 of a laminate roller 210 (e.g., for use in a dot lamination system like roller 10 in system 2 of FIG. 1) including indentations 212 used to form the laminate dots on a material layer in accordance with the invention. In particular, variations in spacing, dimensions and/or shapes of the indentations 212 occur along the length of the roller 210 (length shown by arrow 214) and as further depicted in FIGS. 2A, 2B and 2C (which depict partial cross-sectional views of the roller at different lengthwise locations). A first portion 210A of the roller 210 (e.g., which extends to the first end of the roller as shown in FIG. 2) is depicted in FIG. 2A that includes indentations 212A etched on the surface of the roller in suitable dimensions and spacing so as to provide a zone of high coverage of laminate dots on a material layer surface (e.g., about 60% to about 100% areal coverage). A middle or central portion 210B of the roller 210 is depicted in FIG. 2B and includes indentations 212B etched on the surface of the roller in suitable dimensions and spacing so as to provide a zone of medium coverage of laminate dots on the material layer surface (e.g., about 40% to about 70% areal coverage). A third portion 210C of the roller 210 (e.g., which extends to the second roller end as shown in FIG. 2) is depicted in FIG. 2C that includes indentations 212C etched on the surface of the roller in suitable dimensions and spacing so as to provide a zone of low coverage of laminate dots on a material layer surface (e.g., about 0% to about 50% areal coverage, preferably at least about 30% areal coverage).

The arrangement or array and also sizes and shapes of indentations 212 can be about the same around the circumference of the roller 210 in each zone of coverage. Alternatively, in certain embodiments, the spacing, sizes and/or shapes of indentations 212 can further be varied along the circumference of the roller 210 in each portion of the roller defining the high, medium and low zones of coverage. Thus, the coverage of laminate dots formed by the indentations 212 along the surface of the roller 210 varies along the length of the roller as shown by arrow 214 (e.g., where the coverage decreases from the high zone at a first end of the roller toward the low zone at the second end of the roller).

Thus, one or more rollers (such as rollers 110 and 210) can be provided to apply laminate dots on a material layer surface that vary in amount of laminate material applied along the material layer surface, where the variance in dot lamination areal coverage along portions of the material layer surface can occur in any selected manner (e.g., high-to-medium-to-low, high-to-low-to-medium, medium-to-high-to-low, etc.) based upon the positioning of rollers and/or the arrangement of etched indentations along any one or more rollers.

The type of laminate material used to form the laminate dots on the surface of the material layer can also be selectively modified as desired for a particular application. For example, a lamination system can include two or more troughs having different types of laminate material or, alternatively, laminate material of the same type but having different densities, different viscosities, etc. in the separate troughs for application via the laminate roller at different locations of the material surface. Changing the types of laminate material in different coverage zones can also have an effect on WP/WB characteristics of the laminated material formed.

Such configuration of one or more laminate rollers (with a single trough or a plurality of troughs for applying the same or different types of laminate to a material surface) in a dot lamination system according to the invention facilitates application of laminate dots in a variety of different orientations of different zones of coverage on the surface of a material sheet used to form a material layer, such that portions of the sheet may be cut-out or removed to manufacture sections of the garment that cover different body parts of the wearer. In other words, in accordance with the present invention, the variation in coverage of laminate dots providing a lamination interface between two or more different material layers can be mapped to portions of the garment corresponding with different body parts of the user or wearer of the garment.

Figure 3A:
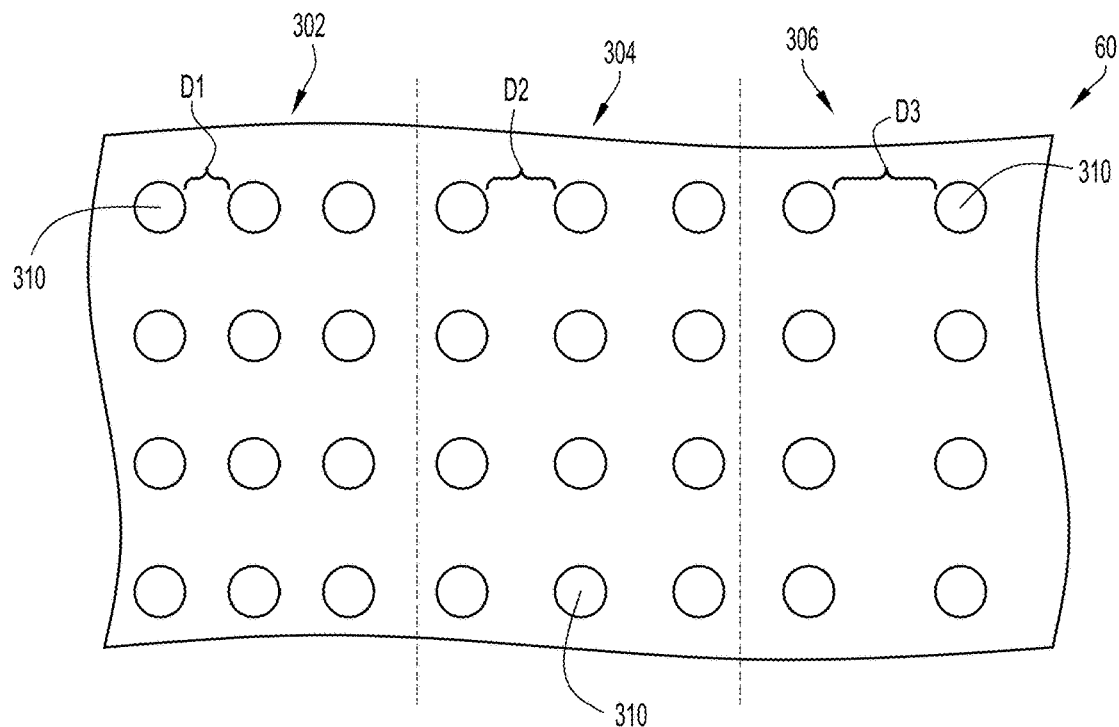
FIGS. 3A and 3B depict different portions of a material layer having laminate dots applied to have different zones of laminate coverage in accordance with the disclosure herein.
Figure 3B:
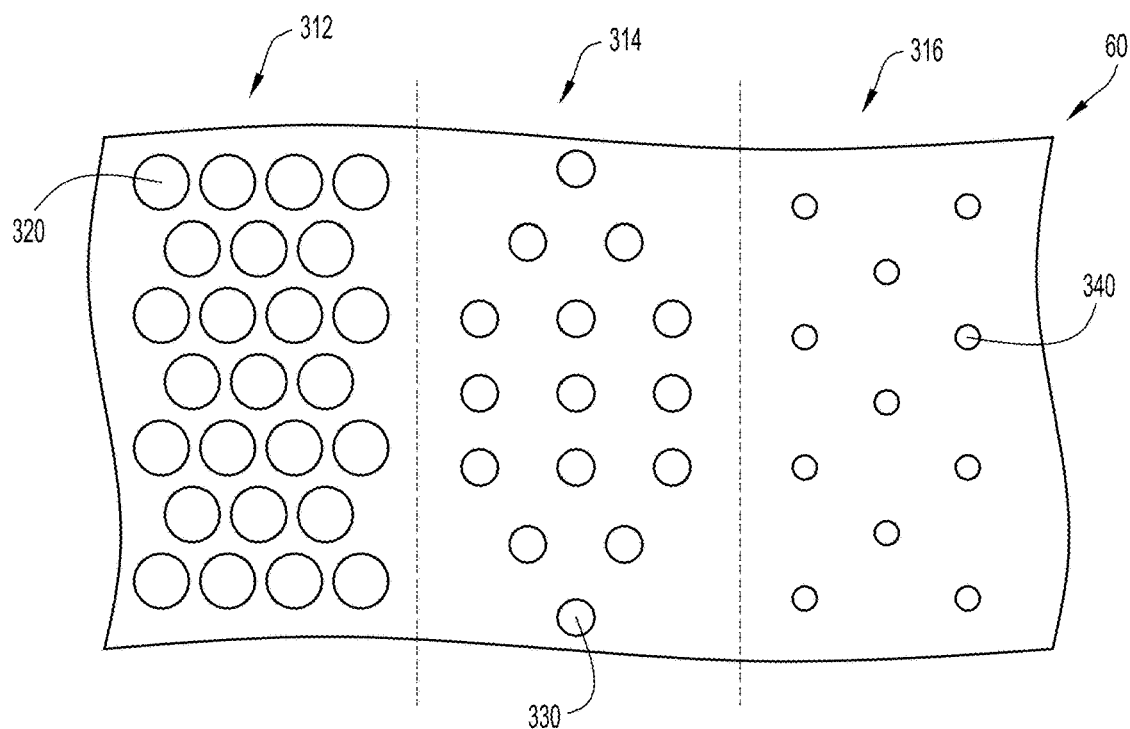
Figure 3C:
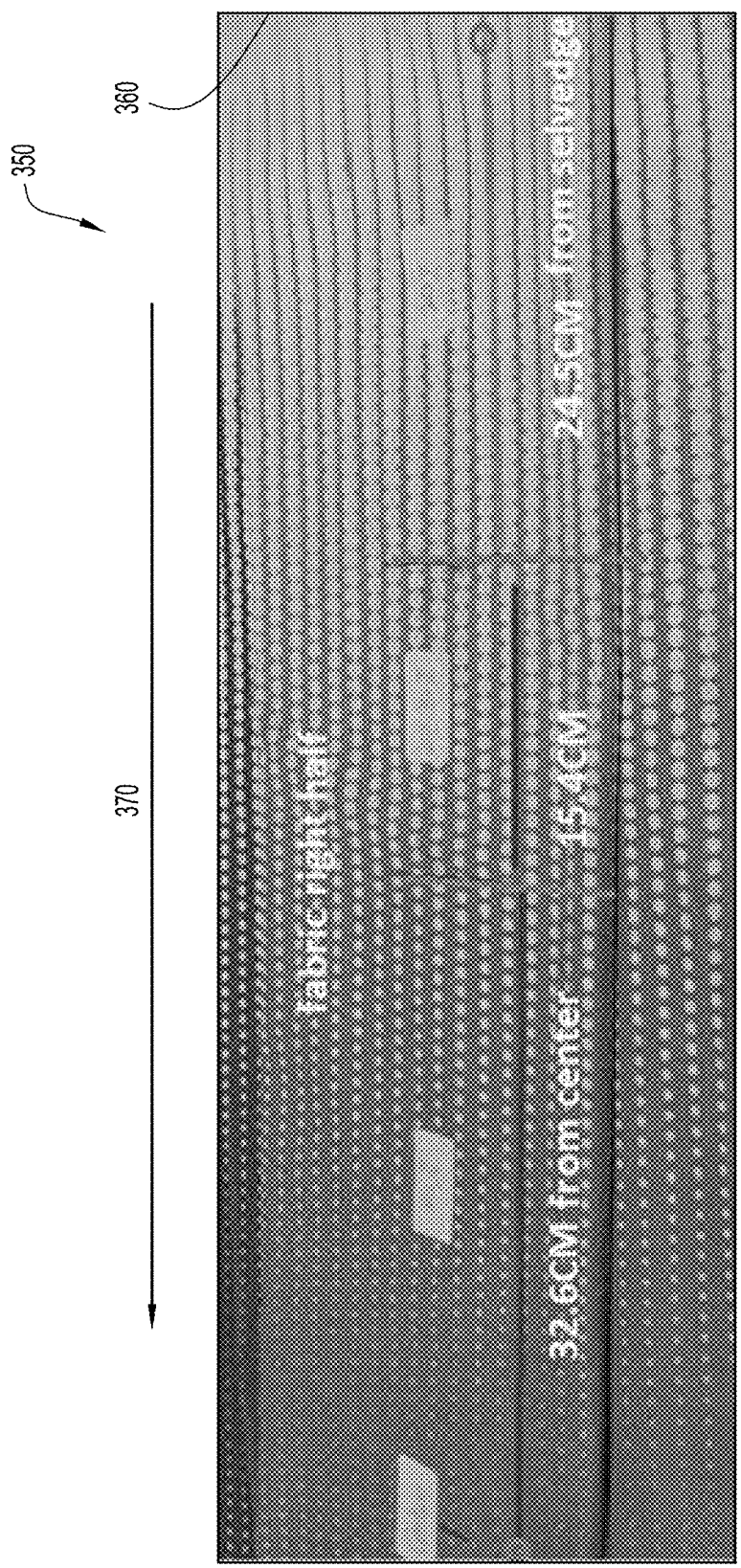
FIG. 3C is a photographic image of a portion of another material layer having laminate dots applied to have different zones of laminate coverage in accordance with the disclosure herein.

Some non-limiting example embodiments of different laminate applications on a material sheet layer (e.g., a fabric layer or a membrane layer for forming a multi-layered WP/WB garment) are depicted in FIGS. 3A, 3B and 3C. Referring to FIG. 3A, a portion of a material layer 60 is depicted having laminate dots 310 applied on its surface 62 (e.g., prior to application of a further material layer 70). In this embodiment, the laminate dots 310 are about the same size (e.g., same or similar circular shape and having same or similar diameters) in each of the zonal areas of coverage 302, 304 and 306 (where the dashed lines show a transition between two zones). The laminate dots 310 in each zone 302, 304, 306 further are spaced in a pattern or arrangement such that the closes distance between adjacent or neighboring dots is the same or constant throughout the zone of coverage. However, the constant distance between closest neighboring laminate dots 310 differ in each of the zones. In particular, the closest proximity distance D1 between adjacent/neighboring laminate dots 310 in zone 302 is less than the closest proximity distance D2 between adjacent/neighboring laminate dots 310 in zone 304, while the closest proximity distance D2 between adjacent/neighboring laminate dots 310 in zone 304 is less than the closest proximity distance D3 between adjacent/neighboring laminate dots 310 in zone 306 (i.e., distance D1<distance D2<distance D3). Accordingly, the areal coverage and areal density of laminate dots 310 is greatest in zone 302 while being the lowest in zone 306.

In another example embodiment depicted in FIG. 3B, a portion of a material sheet layer 60 is depicted also having three zonal areas of coverage 312, 314, 316. In this embodiment, the sizes of laminate dots applied to the surface 62 of the layer 60 differ, where laminate dots 320 in zone 312 have a greater size (e.g., greater diameter) than laminate dots 330 in zone 314 and laminate dots 330 in zone 314 have a greater size (e.g., greater diameter) than laminate dote 340 in zone 316. The spacing between laminate dots can also differ in the different zones, with the greatest spacing distance between closest or neighboring laminate dots being in zone 316 and the smallest spacing distance between closest or neighboring laminate dotes being in zone 312. In this embodiment, the areal coverage and areal density of laminate dots 310 is greatest in zone 302 while being the lowest in zone 306.

In a further embodiment depicted in the photographic image of FIG. 3C, laminate dots can be applied to a material layer surface 350 in a graduated manner in which laminate dots are closely spaced (or even touching) at one zone that approaches one side 360 of the material layer. The laminate dots gradually increase in spacing from each other and/or decrease in size (e.g., decreasing diameter) such that the areal coverage of laminate dots decreases from the zone ear side 360 toward a center or other portion of the material layer surface (as shown in the direction of arrow 370). Thus, while there is not a clear line or boundary of demarcation between different zones of laminate dots, there is a gradual change, spectrum or variance in areal coverage of laminate dots extending along a dimension (e.g., a length and/or width dimension) of the material layer. For example, the areal coverage of laminate dots can be 90% or greater in a first zone (e.g., near a side or edge) of the material layer and, at some portion along the length and/or width of the material layer, the areal coverage of laminate dots can gradually change from 90% down to 20% or less (e.g., in the direction of arrow 370). The material layer can further be covered with laminate dots such that the change or variation in areal coverage from one side to another changed from high coverage to lower coverage and then back to higher coverage again. In particular, the image depicted in FIG. 3C shows a portion (e.g., half) of the material layer. The other portion can be a mirror image of the portion depicted in FIG. 3C, such that the areal coverage increases again continuing in the direction of arrow 370 until reaching the side of the material layer that opposes side 360.

Any other suitable configurations of laminate dots formed on a material surface can be achieved that results in different zones of areal coverage and areal density of the laminate dots within such zones, where such different configurations can include any combinations between zones of changes in dot sizes, shapes, dot pattern arrangements, spacing between dots, etc.

Figure 4:
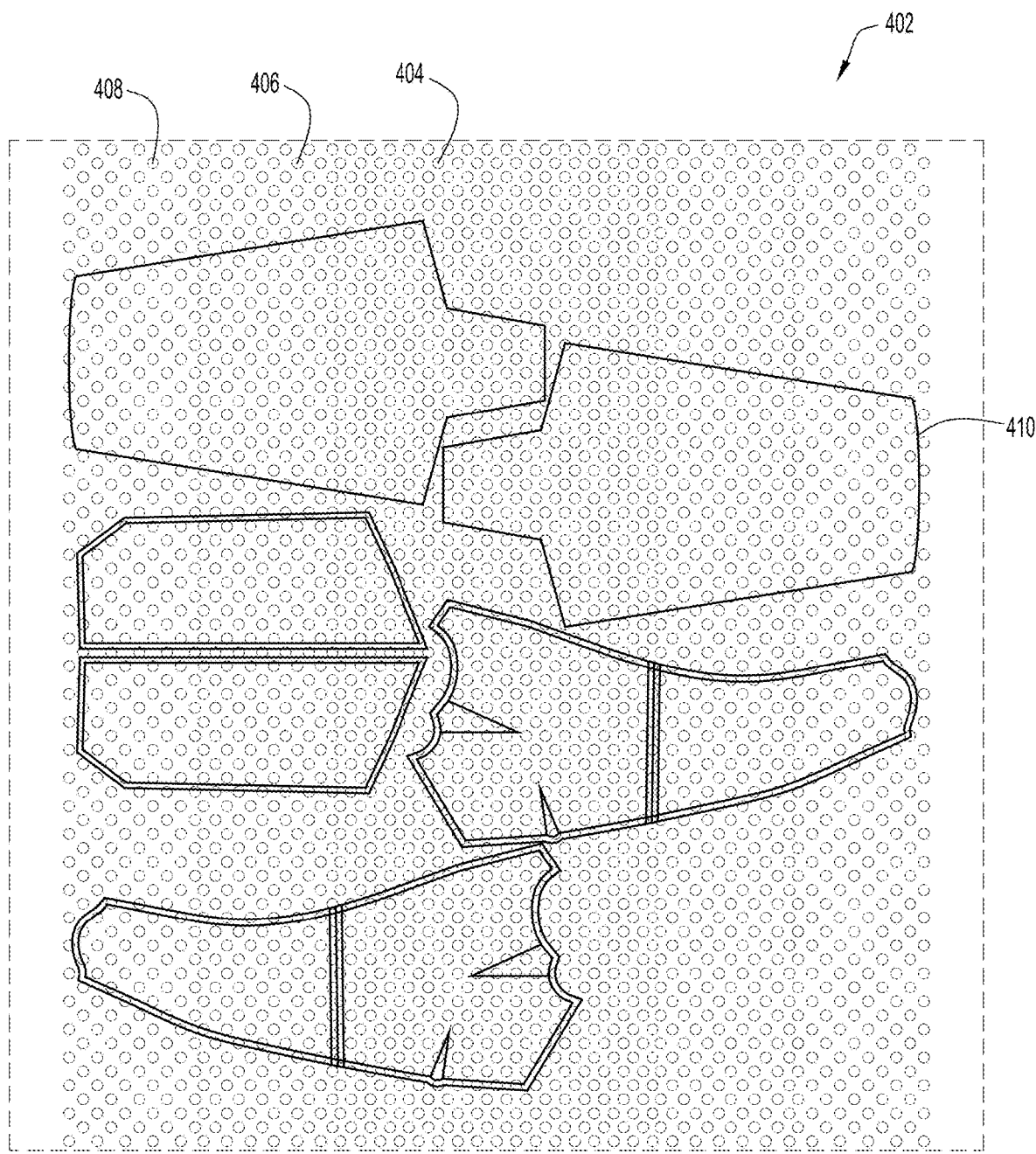
FIG. 4 depicts a view in plan of a garment material including different zones of laminate coverage at different portions of the garment material in accordance with the disclosure herein.

An example embodiment is depicted in FIG. 4 of a garment sheet 402 (outlined by the dashed lines in FIG. 4) comprising at least two material layers (e.g., a WP/WB membrane layer and an outer fabric layer) laminated together via a dot lamination process as previously described herein, where the different portions 402, 404, 406 along the sheet 402 designates different zones of dot lamination coverage. The portions 404 on the garment sheet 402 represent the high zones of areal coverage (i.e., greatest areal coverage values) of the laminate dots, while the portions 406 on the garment sheet 402 represent medium zones of areal coverage (i.e., areal coverage values for portions 406 are less than portions 404) of the laminate dots and the portions 408 on the garment sheet 402 represent low zones of areal coverage of the laminate dots (i.e., lowest areal coverage values). The outlined sections 410 defined on the garment sheet 402 represent cut-out portions to be separated for manufacturing/forming different portions of the garment. Thus, when the garment is formed by combining (e.g., sewing, stitching or connecting/adhering in any other suitable manner) the various sections 410 together, the amount of laminate material will be varied along different portions of the garment associated with different body parts of the wearer.

The different zones of areal coverage (which may also be defined as different zones of areal density or areal number density as previously described herein) represent different amounts of laminate material used to laminate two or more material layers together at the zones. In some example embodiments, the high areal coverage zones may be configured to have the greatest WP rating (e.g., where WP ratings can be up to 20,000 or even greater), the low areal coverage zones may be configured to have the greatest BR rating (e.g., MVTR values can be as large as 20,000 g/m$^2$/day, as large as 30,000 g/m$^2$/day, as large as 40,000 g/m$^2$/day or even greater), and the medium areal coverage zones may be configured to have WP ratings greater than that of the low areal coverage zones while also having BR ratings greater than that of the high areal coverage zones. Alternatively, in other embodiments, the different zones of areal coverage can vary in WP and BR ratings in any other suitable manner. For example, any two or more zones can have the same or similar WP or BR rating while varying in the other type of rating.

An example embodiment is now described of a fabric material that was formed utilizing the methods described herein and having zones of high areal coverage (e.g., from about 60% to about 100% areal coverage), medium areal coverage (e.g., from about 40% to about 70% areal coverage), and low areal coverage (e.g., from about 0% to about 50% areal coverage) for dot lamination. The fabric material was formed with a fabric layer laminated to a membrane, and then subsequent testing was performed to determine WP and BR characteristics as well as tear strength of the fabric material at the different zones of areal coverage of the lamination dots used to form the two layer fabric material. The fabric material was a 15 denier fabric material obtained from HFI Company, Ltd. (Taiwan). The membrane was a suitable membrane material (e.g., a PTFE material such as Goretex). The water resistance values for the fabric material at the different zones were measured/obtained in a similar manner as described herein (utilizing Japan Industrial Standards JIS L1092.B), while the breathability values were measured/obtained also in a similar manner as described herein (utilizing Japan Industrial Standards JIS L1099 B1). The tear strength values (in kg/in) were measured/obtained using the industry standard ASTM D2724. The following table presents the measured characteristics of the fabric material at the different zones.

TABLE 2

WP and BR Performance Data For Fabric Material Formed Having Different Zones of Areal Coverage of Lamination Dots

|  | High Areal Coverage Zone | Medium Areal Coverage Zone | Low Areal Coverage Zone |
| --- | --- | --- | --- |
| Waterproof/Water Resistance | 20,000+ | 19,430 | 16,640 |
| Breathability | 29,048 | 36,871 | 45,252 |
| Tear Resistance (kg/in) | 0.3 | 0.2 | 0.2 |

The data obtained for the textile fabric formed utilizing a method as described herein and presented in Table 2 confirms that, as the areal coverage of the dot lamination increases for the fabric material (due to the variance between zones, there is a corresponding increase in waterproof (water resistance) characteristics (i.e., in the transition between zones). Further, as the areal coverage of the dot lamination decreases between zones, there is a corresponding increase in breathability.

Any suitable types of apparel or garments can be formed with body mapped WP/BR characteristics in accordance with the present invention. An example embodiment of a garment with body mapped WP/BR characteristics is depicted in FIGS. 5A and 5B. The garment is in the form of a hoodie-type jacket 502 that includes a main trunk or torso section 503, a hood section 504 that extends from an upper portion of the torso section 503 and is configured to pull over and cover portions of the head of the wearer, and arm sleeve sections 510 extending transversely from opposing upper side portions (which correspond with the shoulders 511 of the wearer) of the torso section 503. The torso section 503 further includes a front side 506 that corresponds with the chest and abdomen of the wearer and a rear side 508 that corresponds with the back of the wearer. The jacket 502 can be formed with any suitable number of material layers (e.g., a 2 layer, 2.5 layer or 3 layer construction, or any other suitable construction) and in accordance with techniques as described herein so as to include at least an outer fabric layer and a membrane layer laminated with the outer fabric layer with a variance in the amount of laminate material provided at different zones or regions of the jacket 502. The jacket 502 includes high areal coverage regions or zones 520 (e.g., corresponding with zones 404 in FIG. 4), medium areal coverage regions or zones 530 (e.g., corresponding with zones 406 in FIG. 4) and low areal coverage regions or zones 540 (e.g., corresponding with zones 408 in FIG. 4) representing the different amounts of laminate material and corresponding different degrees of WP/BR features provided at such garment zones.

The high areal coverage zones 520 of the jacket 502 having the most laminate material are, e.g., at the hood section 504 and lower portions along the front side 506 of the torso section 503 (e.g., near the waistline of the wearer) and along the corresponding front sides of the arm sections 510 (near the wrists of the wearer). These high areal coverage zones 520 can be configured so as to provide the greatest WP rating for the garment (e.g., WP ratings of about 20,000 or greater). The low areal coverage zones 540 of the jacket 502 are located at a significant portion of the front side 506 of the torso section 503 and along lateral portions (i.e., on either side of the center/spine portion) of the torso rear side 508 and corresponding inner or medial side portions of the arm sections 510 including locations corresponding with the underarm/arm pit regions of the wearer. The low areal coverage zones 540 can provide the greatest BR characteristics for the jacket 502 (e.g., the highest MVTR values for the jacket, such as 20,000 g/m$^2$/day or greater), particularly in regions such as below the arms (e.g., at the arm pit locations) and at portions of the chest of the wearer where perspiration can typically occur. The medium areal coverage zones 530 are located along the outer or lateral side portions of the arm sections 510 (including the outer shoulder portions) and a central portion (including a portion that covers the spine of the wearer) of the torso rear side 508.

The medium areal coverage zones 430 can be configured to provide a greater WP rating in relation to the low areal coverage zones 440 and a greater BR rating in relation to the high areal coverage zones 420. Alternatively, the high, medium and low areal coverage zones can be configured to provide any selected degree of WP and BR features for the jacket 402, where any one or both of such WP and BR features can vary between the different zones. Thus, the jacket 402 can be configured so as to map particular WP and BR features to particular body parts of the wearer depending upon a particular application (e.g., hiking, running, outdoor wet climate activities, etc.). For example, in the embodiment of FIG. 5, portions of the garment can vary in dot lamination areal coverage along a section (e.g., along an arm section, along a leg section, along the torso section, etc.).

Other types of apparel or garments can also be formed so as to include WP/BR features that vary at regions or zones of the garments and are mapped to particular body portions of the wearer. Some non-limiting examples of other types of apparel or garments that can include the WP/BR body mapped features of the present invention include shorts, pants, hats, shirts (e.g., t-shirts or long sleeve shirts), jerseys, sweaters, socks and any other type of clothing. Further, the methods described herein to provide variable WP/BR features to a multi-layered material structure can also be applied to other non-apparel products, such as outdoor hunting, hiking or other gear (e.g., backpacks, tents, hunting blinds, etc.), where such products can be formed in part or in whole with a layered material having laminated features as described herein.

Any one or both of the material layers that are laminated together and/or the laminate material can also be configured to have any suitable color(s) and/or any suitable degree of opacity or transparency to provide any suitable functional and/or aesthetic features for the garment. For example, at least one of two material layers that are laminated together can be configured to have a sufficient degree of transparency and the laminate dots can also be configured to have one or more suitable colors so that some or all of the laminate dots in different WP/BR zones of the garment are visible through one or both laminated material layers (i.e., the laminate dots are visible on interior side portions and/or exterior side portions of the garment). The visibility of laminate dot patterns and/or laminate dot shapes can provide aesthetic features for the garment (enhancing the "look" of the garment). In addition, different laminate dot patterns and/or dot shapes that are visible through one or both laminated material layers can provide functional features such as coding of particular WP/BR zones of the garment (e.g., designating a zone of the garment that has the greatest WP rating and/or greatest BR rating).

The lamination methods described herein can also be applied to other types of garments, such as textile garments that do not include a membrane layer as is the case for WP/BR garments (such as 2 layer, 2.5 layer and 3 layer WP/BR garments). In particular, the lamination methods described herein are also applicable to forming garments that are highly air permeable as measured, e.g., by a CFM (cubic feet per minute) rating of air flow that is achieved through such garments. An example embodiment of such an air permeable or air breathable garment can comprise a garment having two textile layers adhered together by laminate dots. Referring again to FIG. 1, material layers 60 and 70 can each comprise a textile layer. For example, one or both textile layers can comprise a woven, knit or non-woven layer. Each layer can be formed in the same or different manner. For example, both textile layers can be knit layers, woven layers, or nonwoven layers. Alternatively, one layer can be formed as one type of a knit, woven or nonwoven layer while the other layer can be formed as another type of a knit, woven or nonwoven layer (e.g., one layer is knit, the other is woven or nonwoven, etc.).

The same types of dot lamination garment formation processes as described herein for WP/BR garments (in which a membrane layer is within the garment) can also be applied for air permeable textile garments so as to achieve different degrees or a variance in air permeability (e.g., as measured by a CFM rating) at different locations or zones of the garment. For air permeable textile garments, the air permeability is greater (i.e., the garment is more breathable) at defined zones of the garment having lower areal density and lower areal coverage of lamination dots. In other words, a zone of a textile garment having the greatest areal density and greatest areal coverage provides the least air permeability (as measured by CFM of air flow through the garment) at such zone, such that a measured CFM value at this zone is less than a measured CFM value at another zone of the garment having a smaller areal density and smaller areal coverage.

The variance in air permeability (as measured by air flows in CFM through the garment) at different zones of the textile garment can enhance the performance of such garments for different applications. For example, a shirt or jacket used for a runner might have different zones of air permeability imparted at different areas of the garment such that airflow is easily permitted (e.g., low lamination dot areal density and low areal dot coverage and corresponding large measured CFM value) in some areas (e.g., under the arms or at the arm pit locations of the garment, along portions of the chest and/or back of the garment, etc.) while other areas of the garment (e.g., on shoulders and/or along parts of the arms of the garment) are less air permeable (e.g., greater lamination dot areal density and greater areal dot coverage and corresponding lower measured CFM value).

For textile applications, the lamination dots used to impart variable air permeability throughout different portions or zones of a multi layered textile material are generally greater in size (e.g., greater in thickness and/or length/width/diameter dimension) in relation to the lamination dots used to form WP/BR garments. In example embodiments, the lamination dots used to form air permeable textile garments (e.g., with two textile layers secured together via lamination dots) are at least about 10% greater in thickness dimension compared to lamination dots used to form WP/BR garments (e.g., a 2 layer, 2.5 layer or 3 layer WP/BR garment). For this reason, the rollers used in the lamination process for air permeable textile garments have depressions or indentations along their surfaces (used to form the lamination dots on the material layer) that are deeper or have a greater depth dimension in relation to the indentations for rollers used in the lamination process for WP/BR garments.

Thus, a multi-layered garment is provided including at least two layers laminated together with a plurality (e.g., a pattern or array) of lamination dots that varies in different locations or zones of the garment to impart a variance in physical properties of the garment within such zones, in particular waterproof properties, breathability properties and/or air permeability properties. The array of lamination dots can be varied in the different zones in a variety of different ways, such as varying sizes and shapes of dots, varying spacing between dots, and varying types of dots (e.g., varying the type based upon polymer type, density and/or viscosity). For example, a variance in viscosity of polymer material used to form the lamination dots can have an effect on dot coverage on the surface to which the dots are applied (e.g., a greater viscosity of the dot lamination material can result in a greater areal coverage of the dots applied to the material surface).

While the invention has been described in detail and with reference to specific embodiments thereof, it will be apparent to one skilled in the art that various changes and modifications can be made therein without departing from the spirit and scope thereof.

For example, different body mapped WP/BR zones of a garment may include different combinations of material layers and/or partial layers (i.e., material layers that do not extend throughout a particular WP/BR zone of the garment).

In addition, the features of the present invention are not limited to apparel or garments but instead can also be implemented in other products that include layers of fabric or other materials and in which WP and/or BR features are desired. For example, outdoor products such as tents, tarps, covers for vehicles or other items being stored in outdoor environments can be constructed from materials including laminated layers in accordance with the present invention to achieve varying WP/BR features at different zones of the material.

Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", "inner", "outer" and the like as may be used herein, merely describe points of reference and do not limit the present invention to any particular orientation or configuration.

What is claimed:

1. A garment comprising:
    a first material layer including a first surface, the first material layer comprising a membrane layer formed as a film;

a second material layer laminated to the first material layer, the second material layer comprising a textile and including a second surface; and a laminate material disposed in a non-continuous manner between the first and second surfaces of the first and second material layers, wherein an amount of laminate material disposed between the first and second material layers varies at different zones defined along the first surface of the first material layer, the laminate material is disposed in an array of laminate members disposed along the first surface of the first material layer, and the array of laminate members varies at the different zones by one or more selected from the group consisting of spacing between laminate members, dimensions of laminate members and shapes of laminate members.

2. The garment of claim 1, wherein the laminate members comprise laminate dots.

3. The garment of claim 1, wherein two or more zones differ from each other in waterproof (WP) rating and/or breathability (BR) rating.

4. The garment of claim 1, wherein the membrane layer of the first material layer comprises one or more materials selected from the group consisting of polytetrafluoroethylene, polyurethane and polypropylene.

5. The garment of claim 4, wherein the second material layer defines an exterior side of the garment.

6. The garment of claim 1, wherein the second material layer is formed as a knit layer, as a woven layer or as a nonwoven layer.

7. The garment of claim 1, wherein the garment comprises a jacket including a torso section, a hood extending from an upper portion of the torso section, and arm sections extending from opposing upper side portions of the torso section.

8. The garment of claim 7, wherein the hood includes one or more zones having an areal coverage of laminate members disposed along the first surface of the material layer within the one or more zones that is greater than the areal coverage of laminate members in one or more other zones of the garment.

9. The garment of claim 8, wherein portions of the arm sections and torso section that correspond with underarm and chest regions of a wearer of the garment include one or more zones of areal coverage of laminate members along the first surface of the material layer within the one or more zones that is less than the areal coverage of laminate members in one or more other zones of the garment.

10. A garment comprising a torso section, a hood extending from an upper portion of the torso section, and arm sections extending from opposing upper side portions of the torso section, wherein each of the torso section, hood and arms sections comprise:

a first material layer including a first surface;

a second material layer laminated to the first material layer, the second material layer including a second surface; and a laminate material disposed in a non-continuous manner between the first and second surfaces of the first and second material layers, wherein an amount of laminate material disposed between the first and second material layers varies at different zones defined along the first surface of the first material layer, the laminate material is disposed in an array of laminate members disposed along the first surface of the first material layer, and the array of laminate members varies at the different zones by one or more selected from the group consisting of spacing between laminate members, dimensions of laminate members and shapes of laminate members;

wherein:

the hood includes one or more zones having an areal coverage of laminate members disposed along the first surface of the material layer within the one or more zones that is greater than the areal coverage of laminate members in one or more other zones of the garment; and portions of the arm sections and torso section that correspond with underarm and chest regions of a wearer of the garment include one or more zones of areal coverage of laminate members along the first surface of the material layer within the one or more zones that is less than the areal coverage of laminate members in one or more other zones of the garment.

11. The garment of claim 10, wherein the laminate members comprise laminate dots.

12. The garment of claim 10, wherein two or more zones differ from each other in waterproof (WP) rating and/or breathability (BR) rating.

13. The garment of claim 10, wherein the first material layer comprises a membrane layer comprising one or more materials selected from the group consisting of polytetrafluoroethylene, polyurethane and polypropylene.

14. The garment of claim 13, wherein the second material layer comprises a fabric material that defines an exterior side of the garment.

15. The garment of claim 10, where the first and second material layers each comprise a textile material.

16. The garment of claim 15, wherein one or both of the first and second material layers is formed as a knit layer, as a woven layer or as a nonwoven layer.

* * * * *